US007786992B2

(12) United States Patent
Liang et al.

(10) Patent No.: US 7,786,992 B2
(45) Date of Patent: Aug. 31, 2010

(54) METHOD FOR RENDERING MULTI-DIMENSIONAL IMAGE DATA

(75) Inventors: Bor-Sung Liang, Kaohsiung (TW); Shin-Chien Wang, Taipei (TW)

(73) Assignee: Sunplus Technology Co., Ltd., Hsinchu (TW)

(*) Notice: Subject to any disclaimer, the term of this patent is extended or adjusted under 35 U.S.C. 154(b) by 946 days.

(21) Appl. No.: 11/564,068

(22) Filed: Nov. 28, 2006

(65) Prior Publication Data

US 2007/0136368 A1    Jun. 14, 2007

(30) Foreign Application Priority Data

Dec. 2, 2005    (TW) ............................... 94142421 A

(51) Int. Cl.
G06T 15/40    (2006.01)
G06T 15/00    (2006.01)
G06F 17/00    (2006.01)
G06F 19/00    (2006.01)

(52) U.S. Cl. ...................... 345/421; 345/419; 345/422; 463/31; 463/32

(58) Field of Classification Search ........................ None
See application file for complete search history.

(56) References Cited

U.S. PATENT DOCUMENTS 5,805,135 A    9/1998    Suzuoki et al.

2001/0018362 A1* 8/2001 Minagawa et al. ............ 463/31
2002/0118188 A1* 8/2002 Zviaguina et al. ........... 345/421

OTHER PUBLICATIONS

Bhalerao et al, Fast Re-rendering of Volume and surface graphics by depth, color, and opacity buffering, Medical Image Analysis, Sep. 2000, vol. 4, No. 3, pp. 235-251.*

* cited by examiner

Primary Examiner—Xiao M Wu
Assistant Examiner—Tize Ma
(74) Attorney, Agent, or Firm—J.C. Patents

(57) ABSTRACT

A method for rendering multi-dimensional image data having a plurality of objects is disclosed. The method includes the following steps: providing an object database for storing the objects, providing a first pointer storage block, obtaining a depth value of the objects as a pointer which points to an address of the first pointer storage block, storing the pointers of the objects in the object database into the first pointer storage block and according to the depth value, sequentially searching the first pointer storage block to take out the objects from the object database for displaying the image data. The method is able to skip the comparison operations for every object with different depth values as found in the prior art. Therefore, the method can reduce the amount of computation and the occupied memory bandwidth.

8 Claims, 8 Drawing Sheets

10

METHOD FOR RENDERING MULTI-DIMENSIONAL IMAGE DATA

CROSS-REFERENCE TO RELATED APPLICATION

This application claims the priority benefit of Taiwan application Ser. No. 94142421, filed Dec. 2, 2005. All disclosure of the Taiwan application is incorporated herein by reference.

BACKGROUND OF THE INVENTION

1. Field of Invention

The present invention relates to an image processing method, and particularly to a method for rendering multi-dimensional image data.

2. Description of the Related Art

The progress in science and technology has introduced computers into new broader applications, such as in architecture design roving, virtual reality, animation, and advanced game programming. All of the aforementioned applications require 2-dimensional image processing and 3-dimensional image processing. Indeed, in the modern time, the 2-dimensional and 3-dimensional image rendering technology has played a vital role in widespread applications.

In the U.S. Pat. No. 5,805,135, Sony Corporation in Japan has provided a 2-dimensional and 3-dimensional image rendering method, by which an image data to be displayed is divided into a plurality of objects for forming. Take for example, a background, a 2-D sprite (a 2-D picture of a chair for example; for the sake of simplicity, it is to be termed as a sprite hereinafter), a 3-D ball, and a 3-D cup. In which, a sprite can be an object, while a background can be an object or sprite. Furthermore, a sprite can be formed from a combination of a plurality of sprites. In which, the ball and the cup are formed from a number of polygons, and each polygon is counted as an object. Each of the above-described objects possess a depth value therewith, or a Z value for simplicity.

As the above-described object data are fed into an image processor, the image processor starts to compare one by one each of the Z value. For every object, it needs to compare the Z value of the object with all other Z values of preceding inputted objects, until all of the objects in the image data are inputted and sorted completely, followed by graphic manipulations sequentially from the maximum Z value to the minimum Z value.

From the above description, it can be seen that a conventional rendering method requires continuously uninterrupted comparison of the objects. Such exhaustive computation is wasteful of much of the memory bandwidth and provides a heavy burden on the image processor.

SUMMARY OF THE INVENTION

An object of the present invention is to provide a method for rendering multi-dimensional image data for reducing quantity of computation.

Another object of the present invention is to provide a method for rendering multi-dimensional image data for reducing bandwidth consumption of a memory.

The present invention provides a method for rendering multi-dimensional image data having a plurality of objects. The method includes: providing an object database for storing the objects; providing a first pointer storage block; obtaining a depth value of the objects as a pointer which is pointed to an address of the first pointer storage block and storing the pointers of the objects in the object database into the first pointer storage block; and upon displaying the image data, according to the depth value, sequentially searching the first pointer storage block to take out the objects from the object database for displaying.

According to the method for rendering multi-dimensional image data in an embodiment of the present invention, when a first specific object and a second specific object among the objects having a same specific depth value, a second pointer storage block is provided, which includes a plurality of pointer storage arrays, and each pointer storage array includes a plurality of pointer storage units. Then, the pointers which are respectively pointed to the first specific object and the second specific object in the object database are stored into a specific pointer storage array in the second pointer storage block. Moreover, using the specific depth value as a pointer which is pointed to a specific address of the first pointer storage block, the pointer which is pointed to the specific pointer storage array in the second pointer storage block is stored into the first pointer storage block according to the specific depth value.

The present invention provides a method for rendering multi-dimensional image data having a plurality of objects. The method includes: providing an object database for storing the objects; providing a first pointer storage block and a second pointer storage block, wherein the second pointer storage block comprises a plurality of pointer storage units, and each pointer storage unit comprises a first pointer and a second pointer; using a depth value of each of the objects as a pointer which is pointed to an address of the first pointer storage block and storing the pointers which are pointed to the objects in the object database into the first pointer storage block; when a first specific object and a second specific object among the objects have a same specific depth value, the method further comprising: storing the pointer which is pointed to the first specific object in the object database into the first pointer of a first specific pointer storage unit in the second pointer storage block; using the specific depth value as a pointer which pointed to a specific address of the first pointer storage block and storing the pointer which is pointed to the first specific pointer storage unit in the second pointer storage block into the first pointer storage block; storing the pointer which is pointed to the second specific object in the object database into the first pointer of a second specific pointer storage unit in the second pointer storage block; and storing the pointer which is pointed to the second specific pointer storage unit in the second pointer storage block into the second pointer of the first specific pointer storage unit; and upon displaying the image data, according to the depth value, sequentially searching the first pointer storage block and the second pointer storage block to take out the objects from the object database for displaying.

Since the present invention provides an object database, a first pointer storage block, and the pointers of the objects in the object database are stored into the first pointer storage block according to the depth values of the objects. In comparison with the prior art, the rendering method of the present invention is able to skip the originally required comparison operations between any two objects with different depth values. Thus, the method of the present invention is suitable for reducing computation and required bandwidth.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The method for rendering multi-dimensional image data requires the depth value of every object (a sprite or a polygon, for example) to be compared with each other to lead to wasting a substantial amount of image processing time and memory bandwidth are the drawbacks in the prior art. The present invention provides a method for rendering multi-dimensional image data suitable for the reduction of computation and required bandwidth. In the following, an embodiment of the present invention is described.

Figure 1:
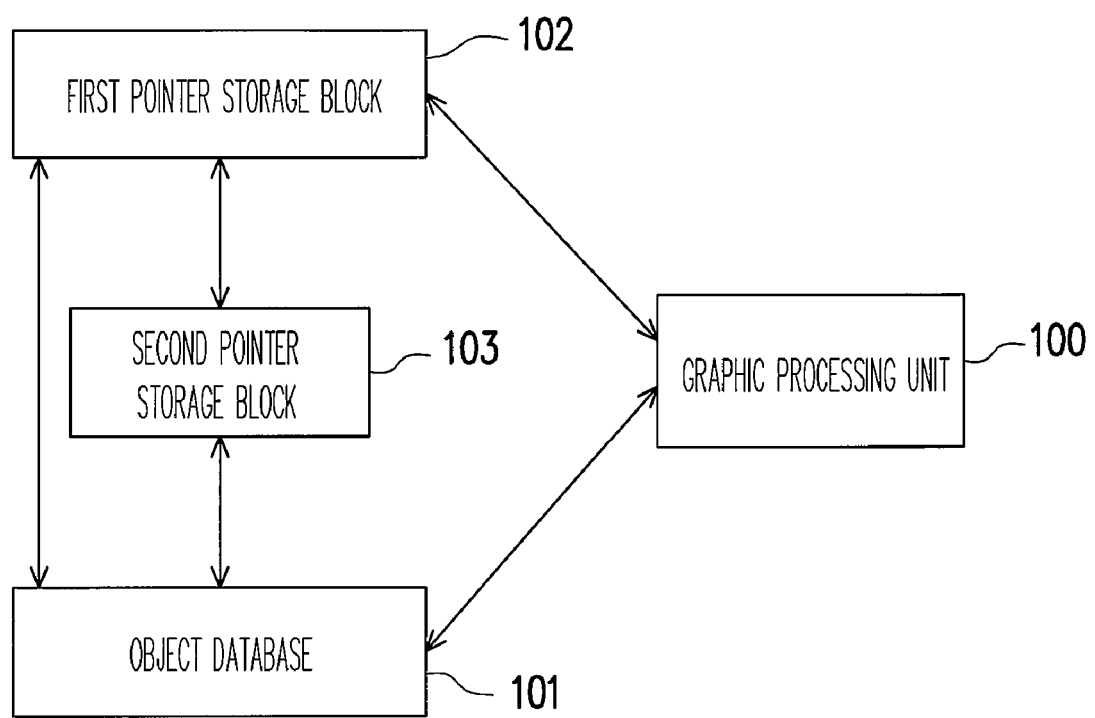
FIG. 1 is a block diagram showing a system for rendering multi-dimensional image data according to an embodiment of the present invention.

FIG. 1 is a block diagram showing a system for rendering multi-dimensional image data according to an embodiment of the present invention. Referring to the block diagram in FIG. 1, a graphic processor 10 based upon the objective of the present invention mainly includes: a graphic processing unit 100; an object database 101; a first pointer storage block 102; and a second pointer storage block 103.

As a plurality of objects of an image data are fed into the graphic processor 10, the objects, regardless of whether each of the objects is a sprites or a different polygon, each has a depth value only (termed as "Z value", hereinafter). The object data received by the graphic processor 10 are stored in the object database 101. Then, the Z values of the objects received by the graphic processor 10 are taken as pointers which are pointed to addresses of the first pointer storage block 102, and the pointers of the objects in the object database 101 are stored into the first pointer storage block 102. Therefore, there is no need for comparing the Z values of the objects as required in the prior art as implemented operations of the graphic processor 10 in the present invention.

In general, the Z values of the object in an image data are likely to be different from each other; hence after a received object is stored in the object database 101, it needs to take the Z value of the stored object as a pointer pointed to a first pointer address in the first pointer storage block 102 and to store the object pointer into the first pointer storage block 102 according to the pointer pointed to the first pointer address, wherein the object pointer points to the address of the stored object in the object database 101. By repeating the above-described steps, all of the object pointers are sequentially sorted according to the Z value of every object in the first pointer storage block 102, which is equivalent to the sorting of the objects based on the Z values thereof. If the sorting was done using the prior art, the Z values of all of the objects received by the graphic processor have to be compared with each other for continuously updated sorting. Therefore, a large amount of memory bandwidth and computation are required. Compared with the prior art, however, the objects are sequentially sorted at the beginning based on the Z values in a memory space (in the first pointer storage block 102) already in the embodiment of the present invention, which is able to save huge amounts of computations and memory bandwidth.

To render the image data, the object pointers stored in the first pointer storage block 102 can be searched starting from the maximum Z value. Then, according to an object pointer, the objects stored in the object database 101 are searched, and the located object is given to the graphic processing unit 100 for graphical plotting. Furthermore, the Z value is gradually decreased and the above-described steps are repeated until all of the objects have been taken out and given to the graphic processing unit 100 for graphical plotting.

In some cases, it is possible that different objects have the same Z value. In order to accommodate such situations, the embodiment of the present invention further provides a second pointer storage block 103 for storing the pointers of the objects with the same Z value in the object database. In the following, a case where a first specific object and a second specific object among a plurality of objects in an image data having the same specific Z value is described as exemplary for describing the operations in the embodiment. Nevertheless, anyone skilled in the art should know that the described case with two specific objects having the same Z value is used as an example only; therefore, the present invention does not place limits on the number of such objects. In fact, the present invention is also applicable to three, four, or more objects with the same Z value.

Figure 2A:
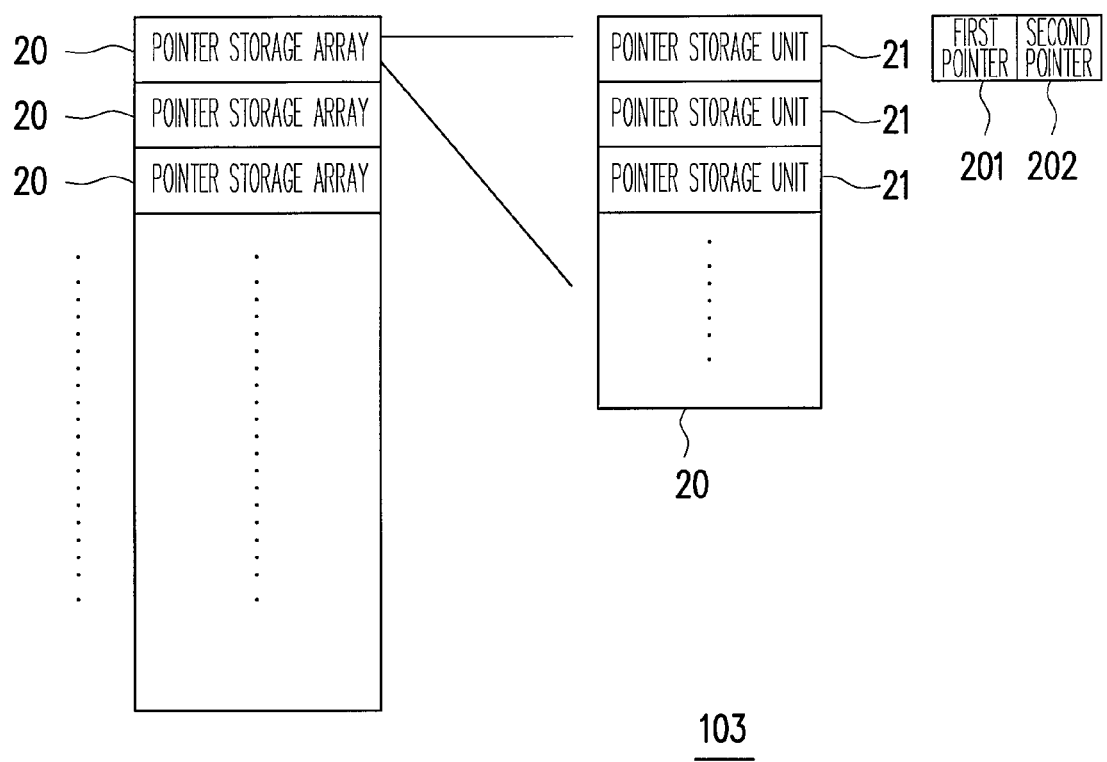
FIG. 2A is an architectural schematic of a second pointer storage block 103.

Referring to FIG. 2A first, it is an architectural schematic of a second pointer storage block 103. It is assumed that the second pointer storage block 103 includes a plurality of pointer storage arrays 20, in which each pointer storage array 20 includes a plurality of pointer storage units 21, and each pointer storage unit 21 further includes a first pointer 201 and a second pointer 202. In the following, the second pointer storage block 103 is described as an example.

When the first specific object and the second specific object in the object database 101 have the same specific Z value, the pointers of the first specific object and the second specific object are first stored into a specific pointer storage array 20S. The pointer which is pointed to the first specific object is stored into the first pointer 201 in the first specific pointer storage unit 21-1; the pointer which is pointed to the second specific object is stored into the first pointer 201 in the second specific pointer storage unit 21-2. In addition, the second pointer 202 in the first specific pointer storage unit 21-1 is pointed to the second specific pointer storage unit 21-2. The second pointer of the second specific pointer storage unit 21-2 is set as, for example, an ending pointer. The pointer which is pointed to the specific pointer storage array 20S in the second pointer storage block 103 is stored into the first pointer storage block 102 corresponding to the specific Z value.

Figure 2B:
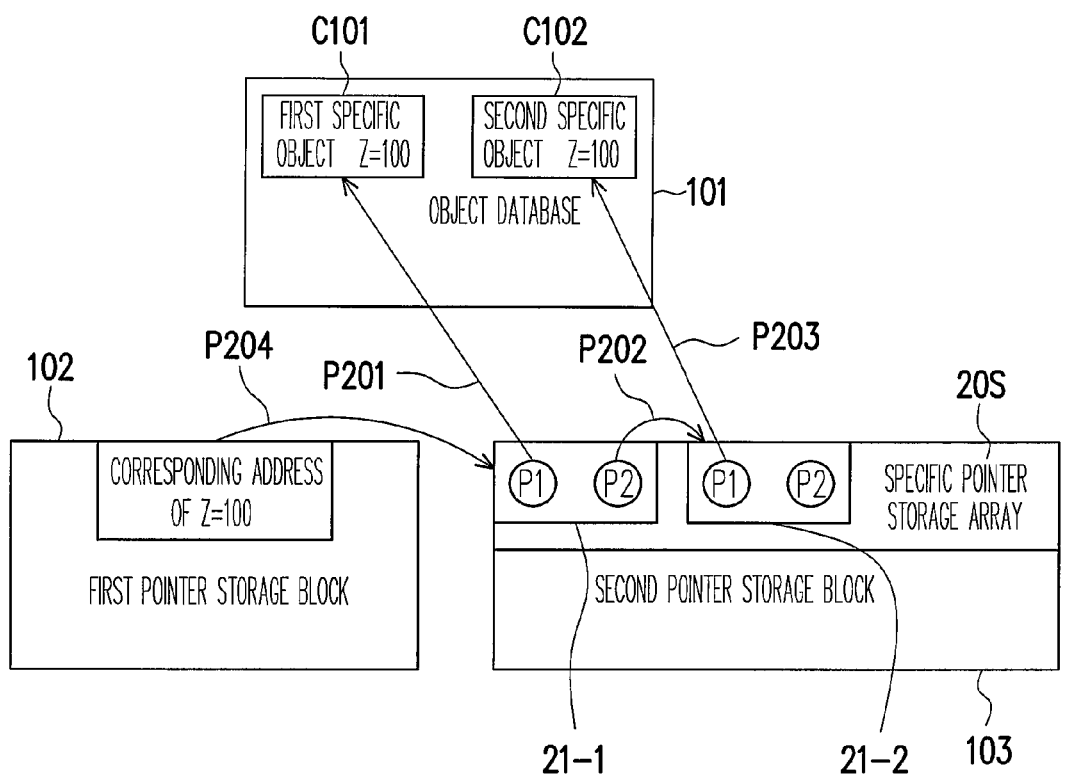
FIG. 2B is an operation concept diagram based on the architectural schematic of the second pointer storage block 103 in FIG. 2A for handling a plurality of objects with the same Z value.

FIG. 2B is an operation concept diagram based on the architectural schematic of the second pointer storage block 103 in FIG. 2A for storing a plurality of objects with the same Z value. When a first specific object C101 and a second specific object C102 in the object database 101 have the same Z value (Z=100), due to a plurality of objects with Z=100, a specific pointer storage array 20S is configured in the second pointer storage block 103 for storing the pointers which are pointed to the objects with the same Z value, in which, a first specific pointer storage unit 21-1 and a second specific pointer storage unit 21-2 are configured in the specific pointer storage array 20S; and the two units 21-1 and 21-2 are used for storing the pointers which are respectively pointed to the first specific object C101 and the second specific object C102. A first pointer P1 stored in the first specific pointer storage unit 21-1 points to the first specific object C101 (shown as an arrow P201 in FIG. 2B), while a second pointer P2 stored in the first specific pointer storage unit 21-1 points to the second specific pointer storage unit 21-2 (shown as an arrow P202 in FIG. 2B). The first pointer P1 stored in the second specific pointer storage unit 21-2 points to the second specific object C102 (shown as an arrow P203 in FIG. 2B), while the second pointer P2 stored in the second specific pointer storage unit 21-2 is an ending pointer. The pointer stored in the first storage block 102 corresponding to the specific Z value of 100 is pointed to the specific pointer storage array 20S (shown as an arrow P204 in FIG. 2B).

To display the image data, the graphic processing unit 100 starts a search for an address in the first pointer storage block 102 from the maximum Z value in order to find an object. Thereafter, the Z value is gradually reduced to the specific Z value; and the specific Z value is used as a pointer, which is pointed to a specific address of the first pointer storage block 102. The first pointer storage block 102 is started to be searched to locate a pointer storage array 20 with a pointer that points to the second pointer storage block 103 and further to locate a first pointer 201 in the first specific pointer storage unit 21-11 for obtaining the first specific object to be plotted. Afterwards, according to a second pointer 202 in the first specific pointer storage unit 21-1 of the graphic processing unit 100 which points to the second specific pointer storage unit 21-2, the second specific pointer storage unit 21-2 is searched for sequentially. According to the first pointer 201 of the second specific pointer storage unit 21-2, the second specific object can be obtained for plotting. Furthermore, the graphic processing unit 100 searches for the ending pointer in the second pointer 202 of the second specific pointer storage unit 21-2, and upon the finding of the ending pointer, the above-described procedures are repeated again and again until the plotting is finished and the image data is displayed by reducing the Z value.

It can be seen that the above-described embodiment can be made into a process flowchart, where the pointers which are pointed to the objects are stored into the first pointer storage block corresponding to the Z values. It is able to reduce the amount of comparison operations originally required by those objects with different Z values. In addition, the present scheme also provides a second pointer storage block where the pointers of several objects with the same Z value can be stored. In comparison with the prior art, although the scheme for the embodiment of the present invention seems slightly more complex to deal with having to assign the storage positions in the second pointer storage block 103 where a lot of objects have the same Z value; however, it is noticeable that the proportion of the objects with the same Z value for a 3D frame is very low. Therefore, under an overall assessment, the present invention certainly is able to achieve the goal of lesser computation for the graphic processor 10 and the reduced occupancy of the memory bandwidth.

Figure 3:
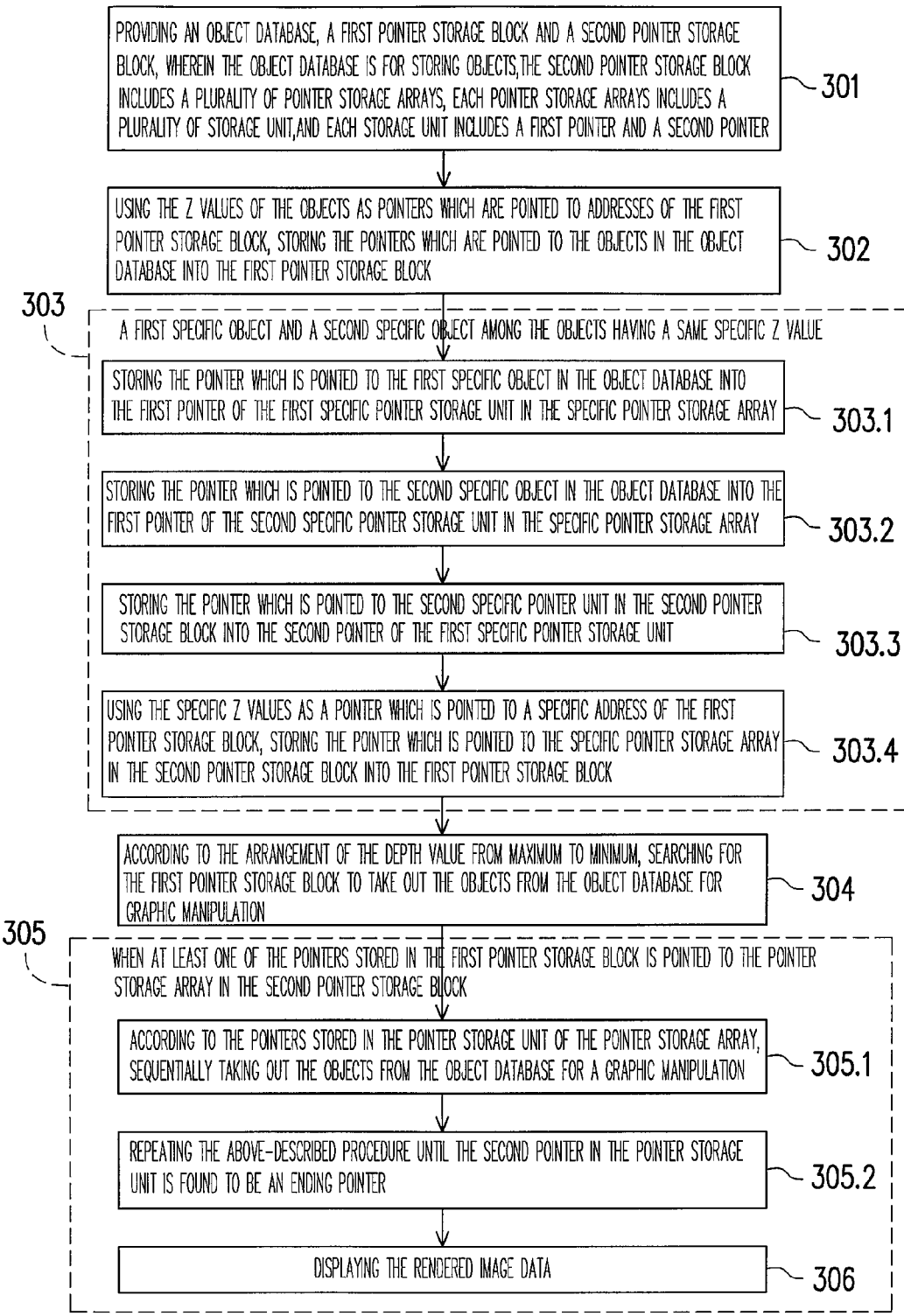
FIG. 3 is a process flowchart of the method for rendering multi-dimensional image data according to the embodiment of the present invention.

FIG. 3 is a process flowchart of the method for rendering multi-dimensional image data according to the embodiment of the present invention, in which the image data has a plurality of objects. Referring to FIGS. 1, 2A, 2B, and 3 at the same time, firstly, an object database 101, a first pointer storage block 102, and a second pointer storage block 103 are provided, where the object database 101 is used for storing the objects, the second pointer storage block 103 includes a plurality of pointer storage arrays 20, each pointer storage array 20 includes a plurality of pointer storage units 21, and each pointer storage unit 21 further includes a first pointer 201 and a second pointer 202 (step 301). Next, the Z values of the objects are taken as pointers which are pointed to addresses of the first pointer storage block 102, and the pointers which are pointed to the objects in the object database 101 are stored into the first pointer storage block 102 according to the Z-values (step 302).

When a first specific object and a second specific object have a same specific depth value (Z value), the pointers which are respectively pointed to the first specific object and the second specific object in the object database 101 are stored into a specific pointer storage array of the second pointer storage block 103 (step 303). The step 303 includes the following sub-steps. First, the pointer which is pointed to the first specific object in the object database is stored into the first pointer of the first specific pointer storage unit in the specific pointer storage array (sub-step 303.1). Next, the pointer which is pointed to the second specific object in the object database is stored into the first pointer of the second specific pointer storage unit in the specific pointer storage array (sub-step 303.2). Afterwards, the pointer which is pointed to the second specific pointer unit in the second pointer storage block is stored into the second pointer of the first specific pointer storage unit (sub-step 303.3). Furthermore, taking the specific Z-values as a pointer, which is pointed to an address of the first pointer storage block, the pointer which is pointed to the specific pointer storage array in the second pointer storage block is stored into the first pointer storage block (sub-step 303.4).

After the step 303, according to the arrangement of the depth value from maximum to minimum, the first pointer storage block 101 is searched to take out the objects from the object database for graphic manipulation (step 304). When at least one of the pointers stored in the first pointer storage block is pointed to the pointer storage array in the second pointer storage block, the step includes the sub-steps as follows (step 305). According to the pointers stored in the pointer storage unit of said pointer storage array, the objects are sequentially taken out from the object database for a graphic manipulation (sub-step 305.1). Next, the sub-step 305.1 is repeated again and again until the second pointer in the pointer storage unit is found to be an ending pointer (sub-step 305.2). Finally, the rendered image data is available and is displayed (step 306).

Figure 4:
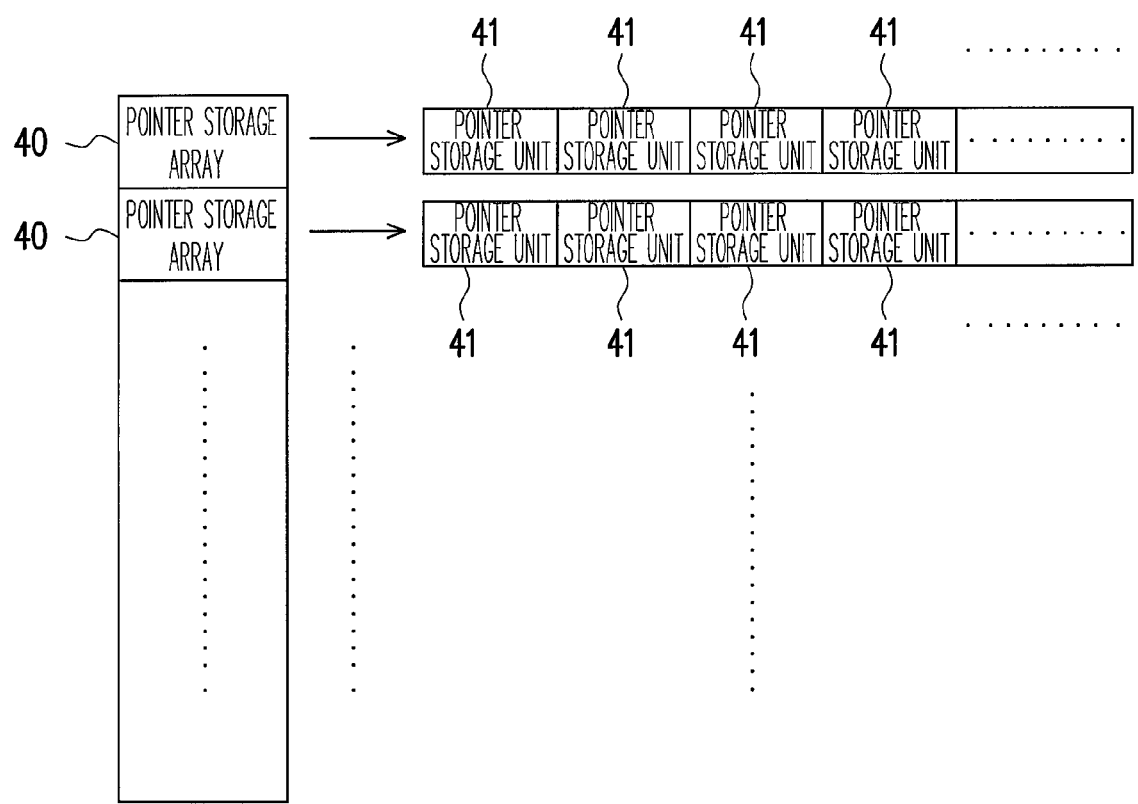
FIG. 4 is an architectural schematic of a second pointer storage block 103 according to another embodiment of the present invention.
Figure 5:
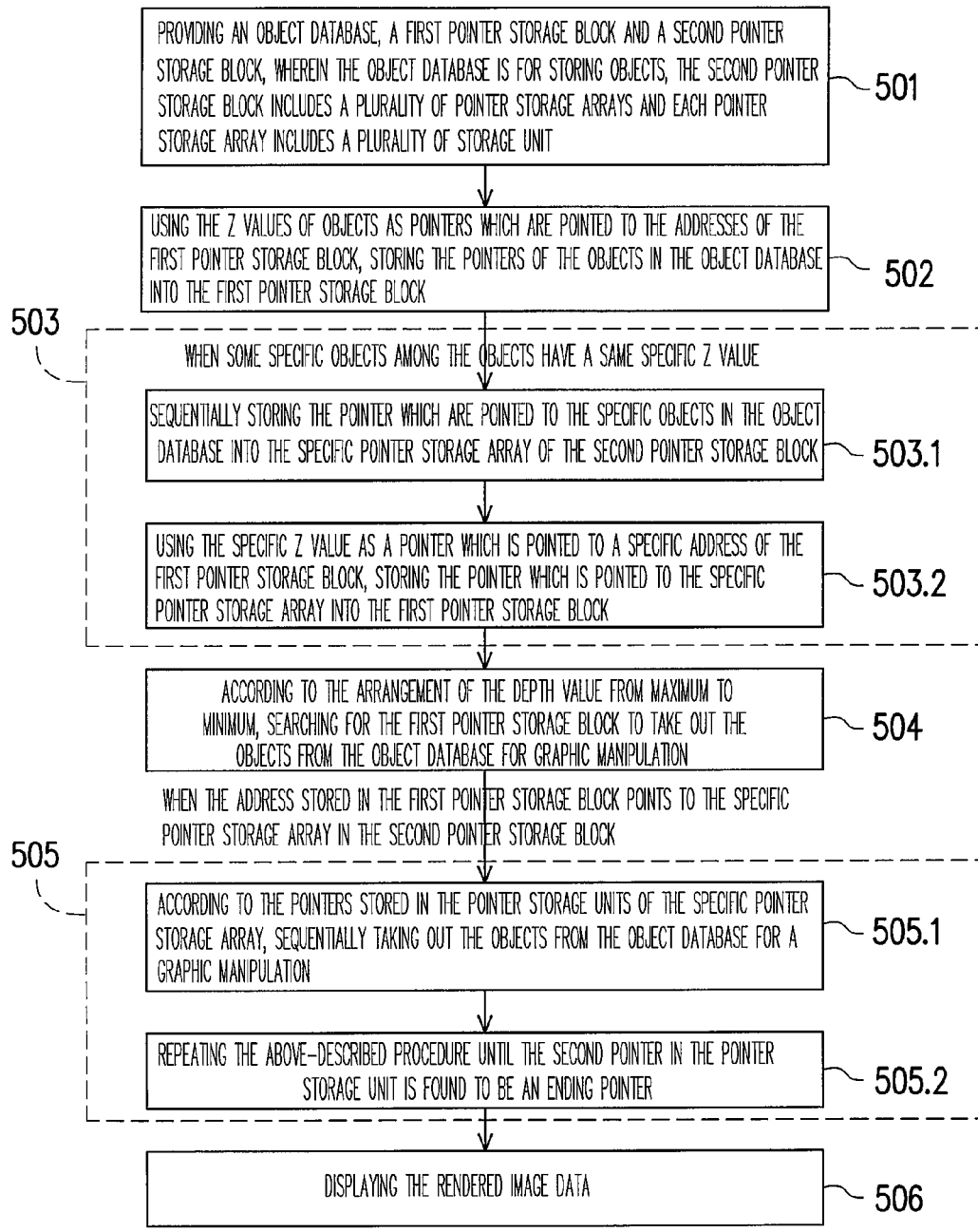
FIG. 5 is an process flowchart of the method for rendering multi-dimensional image data according to another embodiment of the present invention.

In the above-described embodiment, if the second pointer storage block 103 has a different architecture, the method for implementation would also be different. FIG. 4 is an architectural schematic of a second pointer storage block 103 according to another embodiment of the present invention. In which, the second pointer storage block 103 includes a plurality of pointer storage arrays 40, each pointer storage array 40 includes a plurality of pointer storage units 41, and each pointer storage unit 41 is available for storing a pointer. Corresponding to the above-mentioned conditions, another embodiment is shown in FIG. 5, which is a flowchart of the method for rendering multi-dimensional image data according to another embodiment of the present invention.

First, an object database 101, a first pointer storage block 102, and a second pointer storage block 103 are provided, in which the object database 101 is used for storing objects, the second pointer storage block 103 includes a plurality of pointer storage arrays 40, and each pointer storage array 40 includes a plurality of storage units 41 (step 501). Next, taking the Z-values of the objects as pointers which are pointed to addresses of the first pointer storage block, the pointers which are pointed to the objects in the object database 101 are stored into the first pointer storage block 102 (step 502).

When some of the specific objects among the objects have a same specific Z-value, the step includes the sub-steps as follows (step 503): First, the pointers which are pointed to the specific objects in the object database 101 are sequentially stored into the specific pointer storage array of the second pointer storage block 103 (sub-step 503.1). Then, taking the specific Z-values as a pointer which is pointed to a specific address of the first pointer storage block, the pointer which is pointed to the specific pointer storage array in the second pointer storage block is stored into the first pointer storage block (sub-step 503.2).

Then, according to the arrangement of the depth value from maximum to minimum, the first pointer storage block 102 is searched to take out the objects from the object database for graphic manipulation (step 504). When the pointer stored in the first pointer storage block 101 points to the specific pointer storage array 40 in the second pointer storage block 102, the (step 505) includes the sub-steps as follows: First, according to the pointers stored in the pointer storage unit of the pointer storage array 40, the objects are sequentially taken out from the object database to perform a graphic manipulation (sub-step 505.1). Next, the (sub-step 505.1) is repeated again and again until the pointer in the pointer storage unit is found to be an ending pointer (sub-step 505.2). Finally, the rendered image data is available and is displayed (step 506).

Figure 6:
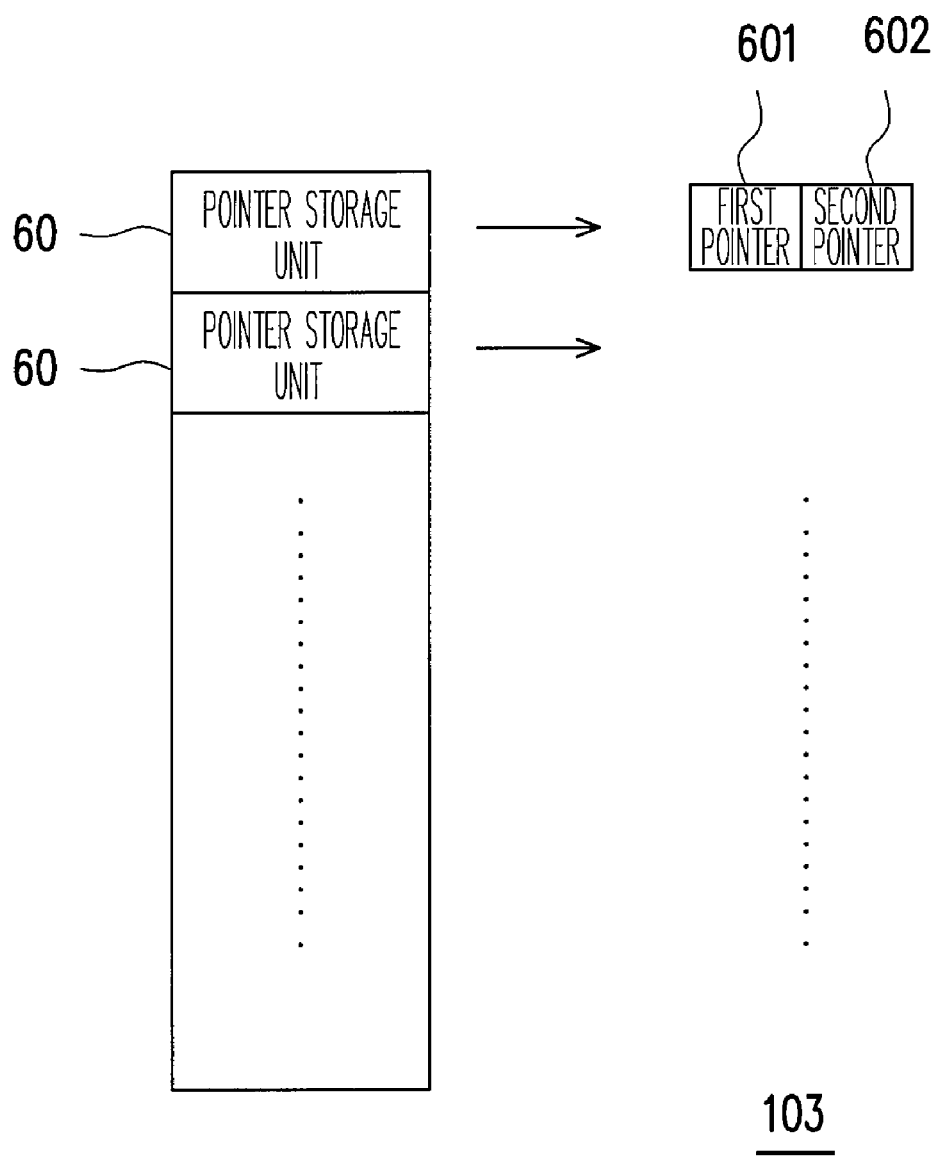
FIG. 6 is an architectural schematic of a second pointer storage block 103 according to yet another embodiment of the present invention.
Figure 7:
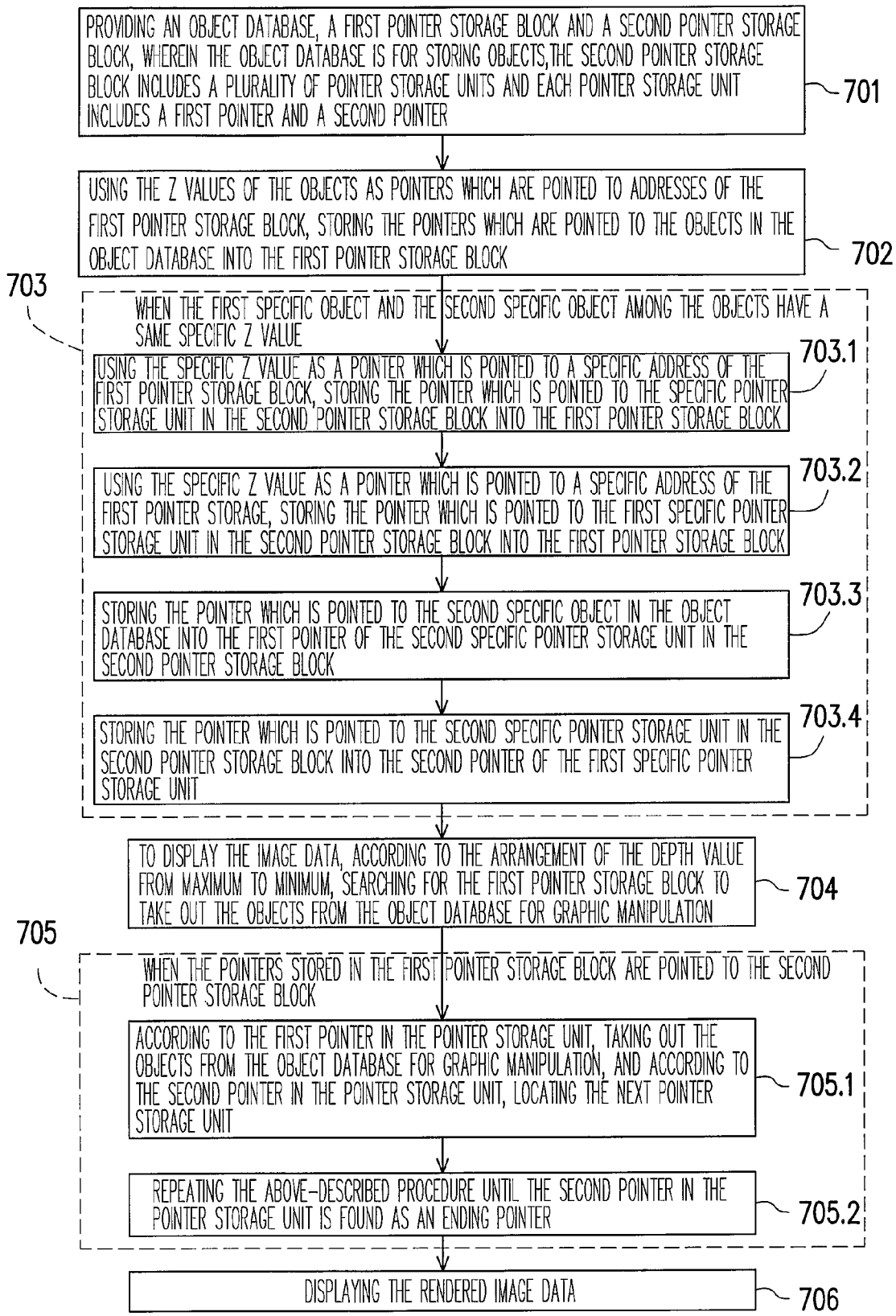
FIG. 7 is a process flowchart of the method for rendering multi-dimensional image data according to yet another embodiment of the present invention.

Similarly, the second pointer storage block 103 in the above-described embodiment has a different architecture as shown in FIG. 6, and the method for implementation would be also different. In which, the second pointer storage block 103 includes a plurality of pointer storage units 60, where each pointer storage unit 60 includes a first pointer 601 and a second pointer 602. Under the above-mentioned conditions, there is yet another embodiment as shown in FIG. 7, which is a process flowchart of the method for rendering multi-dimensional image data according to yet another embodiment of the present invention.

First, an object database 101, a first pointer storage block 102, and a second pointer storage block 103 are provided, in which the object database 101 is used for storing objects, the second pointer storage block 103 includes a plurality of pointer storage units 60, and each pointer storage unit 60 includes a first pointer 601 and a second pointer 602 (step 701). Next, taking the Z-values of objects as pointers which are pointed to addresses of the first pointer storage block, the pointers which are pointed to the objects in the object database 101 are stored into the first pointer storage block 102 (step 702).

When the first specific object and the second specific object among the objects have a same specific Z-value, the step 703 includes the sub-steps as follows. First, the pointer, which is pointed to the first specific object in the object database 101 is stored into the first pointer 601 of the first specific pointer storage unit 60 in the second pointer storage block 103 (sub-step 703.1). Next, taking the specific Z-value as a pointer which is pointed to a specific address of the first pointer storage block, the pointer which is pointed to the first specific pointer storage unit 60 in the second pointer storage block 103 are stored into the first pointer storage block 102 (sub-step 703.2). Afterwards, the pointer which is pointed to the second specific object in the object database 101 is stored into the first pointer 601 of the second specific pointer storage unit 60 in the second pointer storage block 103 (sub-step 703.3). Then, the pointer which is pointed to the second specific pointer storage unit 60 in the second pointer storage block 103 are stored into the second pointer 602 of the first specific pointer storage unit 60 (sub-step 703.4).

Then, to display the image data, according to the arrangement of the depth value from maximum to minimum, it searches for the first pointer storage block 102 to take out the objects from the object database to perform graphic manipulation (step 704). When the pointers stored in the first pointer storage block points to the second pointer storage block 103, the step 705 includes the sub-steps as follows. First, according to the first pointer 601 in the pointer storage unit 60, the objects are taken out from the object database to perform graphic manipulation; and according to the second pointer 602 in the pointer storage unit 60, the next pointer storage unit 60 is located (sub-step 705.1). Next, the (sub-step 705.1) is repeated again and again until the second pointer in the pointer storage unit 60 is found to be an ending pointer (sub-step 705.2). Finally, the rendered image data is available and is displayed (step 706).

In summary, the present invention provides an object database and a first pointer storage block, and the pointers of objects in the object database are stored into the first pointer storage block according to the depth values of the objects. The rendering method of the present invention is able to skip the originally required comparison operations between any two objects with different depth values as found in the prior art. Thus, the method of the present invention is suitable for reducing computation and the required bandwidth.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A method for rendering multi-dimensional image data applied in a graphic processor, wherein the multi-dimensional image data comprises a plurality of objects, comprising:

providing an object database for storing the objects;

providing a first pointer storage block;

providing respectively a depth value for the objects as a pointer which is pointed to an address of the first pointer storage block and storing the pointers from the objects in the object database into the first pointer storage block;

using the graphic processor to sequentially search the first pointer storage block to take out the objects from the object database for displaying the multi-dimensional image data according to the depth value; and wherein when a first specific object and a second specific object among the objects having a same specific depth value, the method further comprises:

providing a second pointer storage block, which comprises a plurality of pointer storage arrays having a plurality of pointer storage units respectively;

storing the pointers pointed respectively to the first specific object and the second specific object of the object database into a specific pointer storage array of the second pointer storage block;

using the specific depth value as a pointer which is pointed to a specific address of the first pointer storage block; and storing the pointer which is pointed to the specific pointer storage array of the second pointer storage block into the first pointer storage block according to the specific address of the first pointer storage block.

2. The method for rendering multi-dimensional image data applied in a graphic processor as recited in claim 1, wherein each pointer storage unit comprises a first pointer and a second pointer, further comprising:

storing the pointer pointed to the first specific object in the object database into the first pointer of a first specific pointer storage unit in the specific pointer storage array;

storing the pointer which is pointed to the second specific object in the object database into the first pointer of a second specific pointer storage unit in the specific pointer storage array; and storing the pointer which is pointed to the second specific pointer storage unit in the second pointer storage block into the second pointer of the first specific pointer storage unit, wherein the pointer pointed to the specific pointer storage array in the second pointer storage block is the pointer pointed to the first specific pointer storage unit in the second pointer storage block.

3. The method for rendering multi-dimensional image data applied in a graphic processor as recited in claim 1, wherein storing the pointers pointed respectively to the first specific object and the second specific object in the object database into the specific pointer storage array further comprising:

taking the specific depth value as the pointer which is pointed to the specific address of the first pointer storage block; and storing the pointer pointed to the first pointer storage unit in the specific pointer storage array into the first pointer storage block according to the specific address of the first pointer storage block.

4. The method for rendering multi-dimensional image data applied in a graphic processor as recited in claim 1, wherein, further comprising:

sequentially searching and taking out the objects of the object database from the first pointer storage block for plotting and displaying the plotted image data according to the depth value from the maximum to the minimum.

5. The method for rendering multi-dimensional image data applied in a graphic processor as recited in claim 1, wherein, upon displaying the image data, according to the depth value, sequentially searching the first pointer storage block to take out the objects from the object database for displaying, comprising:

sequentially searching and taking out the objects of the object database from the first pointer storage block for plotting manipulation according to the depth value from the maximum to the minimum;

when a pointer stored in the first pointer storage block points to one of the pointer storage arrays of the second pointer storage block, sequentially taking out the objects of the object database for plotting manipulation according to the pointers stored in the pointer storage units in said pointer storage array, and continuing the above-described procedure once the taking out is completed; and displaying the image data having the plotting manipulation.

6. A method for rendering multi-dimensional image data applied in a graphic processor, wherein the multi-dimensional image data comprises a plurality of objects, comprising:

providing an object database for storing the objects;

providing a first pointer storage block and a second pointer storage block, wherein the second pointer storage block comprises a plurality of pointer storage units, and each said pointer storage unit comprises a first pointer and a second pointer;

using the graphic processor to use a depth value of the objects as a pointer which is pointed to an address of the first pointer storage block and storing the pointers of the objects from object database into the first pointer storage block;

when a first specific object and a second specific object among the objects have a same specific depth value, the method further comprising:

storing the pointer which is pointed to the first specific object in the object database into the first pointer of a first specific pointer storage unit in the second pointer storage block;

using the specific depth value as a pointer which is point to a specific address of the first pointer storage block and storing the pointer which is pointed to the first specific pointer storage unit of the second pointer storage block into the first pointer storage block according to the specific address of the first pointer storage block;

storing the pointer which is pointed to the second specific object of the object database into the first pointer of a second specific pointer storage unit in the second pointer storage block; and storing the pointer which is pointed to the second specific pointer storage unit of the second pointer storage block into the second pointer of the first specific pointer storage unit; and using the graphic processor to sequentially search and take out the objects of the object database from the first pointer storage block and the second pointer storage block for displaying the multi-dimensional image data according to the depth value 7. The method for rendering multi-dimensional image data applied in a graphic processor as recited in claim 6, further comprising:

sequentially searching and taking out the objects of the object database from the first pointer storage block for plotting manipulation, and displaying the multi-dimensional image data having the plotting manipulation according to the depth value from the maximum to the minimum.

8. The method for rendering multi-dimensional image data applied in a graphic processor as recited in claim 7, further comprising:

when a pointer stored in the first pointer storage block points to one of the pointer storage arrays of the second pointer storage block, taking out the objects from the object database for plotting manipulation according to the first pointer stored in the pointer storage unit of said pointer storage array, and locating the next pointer storage unit according to the second pointer stored in the pointer storage unit of said pointer storage array; and repeating the above-described procedure until the second pointer in the pointer storage unit is found as an ending pointer.

* * * * *